US012650493B2

(12) United States Patent
Chen et al.

(10) Patent No.: US 12,650,493 B2
(45) Date of Patent: Jun. 9, 2026

(54) LASER SOURCE, LIGHT EMITTING UNIT, AND LIDAR

(71) Applicant: HESAI TECHNOLOGY CO., LTD., Shanghai (CN)

(72) Inventors: Jie Chen, Shanghai (CN); Shaoqing Xiang, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 810 days.

(21) Appl. No.: 18/067,997

(22) Filed: Dec. 19, 2022

(65) Prior Publication Data

US 2023/0117963 A1 Apr. 20, 2023

Related U.S. Application Data

(63) Continuation of application No. PCT/CN2021/105549, filed on Jul. 9, 2021.

(30) Foreign Application Priority Data

Aug. 25, 2020 (CN) .......................... 202010876205.1

(51) Int. Cl.
*G01S 17/00* (2020.01)
*G01S 7/481* (2006.01)
*G01S 17/08* (2006.01)

(52) U.S. Cl.
CPC ........... *G01S 7/4811* (2013.01); *G01S 7/4816* (2013.01); *G01S 17/08* (2013.01)

(58) Field of Classification Search
CPC ...... G01S 7/4811; G01S 7/4816; G01S 17/08; G01S 7/4868; G01S 17/42; G01S 7/4815; G01S 17/02; G01S 7/4802; G01S 17/931
See application file for complete search history.

(56) References Cited

U.S. PATENT DOCUMENTS

| | | | |
|---|---|---|---|
| 7,417,716 B2 | 8/2008 | Nagasaka et al. | |
| 7,864,304 B2 | 1/2011 | Yamada et al. | |
| 11,274,929 B1 * | 3/2022 | Afrouzi ..................... | G06T 7/30 |
| 11,298,835 B2 * | 4/2022 | Kim ....................... | B25J 19/026 |

(Continued)

FOREIGN PATENT DOCUMENTS

| | | |
|---|---|---|
| CN | 1677053 A | 10/2005 |
| CN | 108445506 A | 8/2018 |

(Continued)

OTHER PUBLICATIONS

Machine Translation of JP-2019521355-A.*

(Continued)

*Primary Examiner* — Frank F Huang

(74) *Attorney, Agent, or Firm* — Chiesa Shahinian & Giantomasi PC; Xuezheng Wang

(57) ABSTRACT

A laser source, a light emitting unit, and a lidar are provided. The light emitting unit is used in the lidar, and the light emitting unit includes: a first light emitting region and a second light emitting region. Sizes of the first light emitting region and the second light emitting region are different. The first light emitting region and the second light emitting region form the same light emitting channel, and respectively detect target objects at different distances, thereby reducing emission power of the light emitting unit.

24 Claims, 6 Drawing Sheets

(56) References Cited

U.S. PATENT DOCUMENTS

| | | | | |
|---|---|---|---|---|
| 11,327,483 | B2 * | 5/2022 | al-Mohssen | A47L 11/4011 |
| 11,327,503 | B2 * | 5/2022 | Deyle | G06V 20/58 |
| 11,331,805 | B2 * | 5/2022 | Cappello | A63F 13/90 |
| 11,579,252 | B2 * | 2/2023 | Robertson, Jr. | F28F 3/025 |
| 12,449,548 | B2 * | 10/2025 | Peter | G06V 10/30 |
| 2005/0184301 | A1 | 8/2005 | Nagasaka et al. | |
| 2017/0225336 | A1 * | 8/2017 | Deyle | B25J 11/008 |
| 2019/0266414 | A1 * | 8/2019 | Stawiszynski | G06Q 50/26 |
| 2019/0310375 | A1 | 10/2019 | Finkelstein et al. | |
| 2020/0249318 | A1 | 8/2020 | Henderson et al. | |
| 2021/0208949 | A1 * | 7/2021 | Bijwe | G06F 9/5005 |
| 2021/0333406 | A1 * | 10/2021 | Lee | G01S 7/4817 |
| 2022/0120867 | A1 * | 4/2022 | Liang | G01S 7/4815 |
| 2022/0146682 | A1 * | 5/2022 | Park | G01S 17/894 |
| 2023/0117963 | A1 * | 4/2023 | Chen | G01S 7/4815 356/4.01 |
| 2023/0119371 | A1 * | 4/2023 | Zhu | G01S 7/4863 356/5.01 |
| 2023/0137192 | A1 * | 5/2023 | Liang | G01S 17/894 356/4.01 |
| 2023/0145710 | A1 * | 5/2023 | Xiong | G01S 7/4816 356/4.01 |
| 2023/0168376 | A1 * | 6/2023 | Won | G01S 17/10 356/4.01 |
| 2024/0310486 | A1 * | 9/2024 | Qi | G01S 7/4813 |
| 2025/0208265 | A1 * | 6/2025 | Xu | G01S 7/4817 |

FOREIGN PATENT DOCUMENTS

| | | | | |
|---|---|---|---|---|
| CN | 109633683 | A | 4/2019 | |
| CN | 111142088 | A | 5/2020 | |
| CN | 111487639 | A | 8/2020 | |
| CN | 212872895 | U | 4/2021 | |
| JP | 2019521355 | A * | 7/2019 | G01S 7/4816 |
| WO | 2009012886 | A1 | 1/2009 | |

OTHER PUBLICATIONS

Extended European Search Report mailed Jul. 25, 2024 in connection with European Patent Application No. 21859918.1, 9 pgs.

International Search Report and Written Opinion mailed Oct. 11, 2021, in connection with International Patent Application No. PCT/CN2021/105549, 10 pgs. (including translation).

Notice of Allowance mailed Jun. 9, 2025, in connection with Chinese Patent Application No. 202010876205.1, 2 pgs. (including translation).

Search Report mailed May 26, 2025, in connection with Chinese Patent Application No. 202010876205.1, 4 pgs. (including translation).

* cited by examiner

LASER SOURCE, LIGHT EMITTING UNIT, AND LIDAR

CROSS-REFERENCE TO RELATED APPLICATIONS

This application is a Continuation of International Patent Application No. PCT/CN2021/105549, filed Jul. 9, 2021, which claims priority from Chinese Patent Application No. 202010876205.1, filed Aug. 25, 2020; the disclosures of all of which are incorporated herein by reference in their entirety.

TECHNICAL FIELD

The present invention relates to the lidar field, and in particular, to a laser source, a light emitting unit, and a lidar.

BACKGROUND

A lidar undertakes important tasks such as lane line detection, obstacle recognition, simultaneous localization, and mapping (SLAM) in automatic driving.

Specifically, a lidar includes a laser emitting system and a light receiving system. The laser emitting system includes a light emitting unit that generates an emission light pulse, where the emission light pulse is incident onto a target object and reflected, and an echo light is generated, and the echo light is finally received by the light receiving system. The lidar accurately measures a time of flight of an incident light pulse from being emitted to being reflected back. Since a light pulse transmits at a speed of light, and the speed of light is known, the time of flight can be converted into measurement of a distance.

The lidar can accurately measure a position (a distance and an angle), a motion state (a speed, a vibration, and a posture) and a shape of a target, to detect, identify, distinguish, and track the target. Due to advantages such as a fast measurement speed, high accuracy, and a capability of long-range measurement, the lidar is widely applied in unmanned vehicles.

However, in disclosed technologies, the light emitting unit of the lidar has a problem of relatively high emission power.

SUMMARY

Technical Problem

The problem of the present invention to be resolved is to provide a laser source, a light emitting unit, and a lidar to reduce the emission power.

Solutions to the Problem

Technical Solutions

Technical solutions of the present invention provide a laser source, including: at least two light emitting regions, where sizes of the at least two light emitting regions are different.

Optionally, the at least two light emitting regions share a same activation signal and are simultaneously driven to emit light.

Optionally, the at least two light emitting regions emit lights of different power or intensity.

Optionally, each of the light emitting regions includes one or more vertical-cavity surface-emitting lasers.

Optionally, a plurality of vertical-cavity surface-emitting lasers are arranged into a circle in one of the light emitting regions.

Optionally, a plurality of vertical-cavity surface-emitting lasers are arranged into a rectangle in one of the light emitting regions.

The technical solutions of the present invention further provide a light emitting unit for a lidar, and the lidar further includes a light receiving unit, where the light emitting unit includes: a first light emitting region; and a second light emitting region, where sizes of the first light emitting region and the second light emitting region are different, and the first light emitting region and the second light emitting region form a same light emitting channel, and where the first light emitting region and the second light emitting region detect target objects at different distances, respectively.

Optionally, the second light emitting region is farther from a light receiving unit of the lidar than the first light emitting region.

Optionally, the first light emitting region represents a circular light emitting region.

Optionally, the second light emitting region represents a rectangular light emitting region.

Optionally, the circular light emitting region includes a plurality of vertical-cavity surface-emitting lasers, where the plurality of vertical-cavity surface-emitting lasers are arranged into a honeycomb array in the circular light emitting region.

Optionally, the second light emitting region includes one or more vertical-cavity surface-emitting lasers, where the plurality of vertical-cavity surface-emitting lasers are arranged in a matrix arrangement or staggered arrangement.

Optionally, a diameter of the circular light emitting region is in a range of 200 microns to 300 microns.

Optionally, the light emitting unit includes a first end near the light receiving unit and a second end away from the light receiving unit, a direction from the first end to the second end represents a first direction, the light emitting unit includes a light emitting surface, and a direction in the light emitting surface that is perpendicular to the first direction represents a second direction; and where a size of the second light emitting region in the second direction is smaller than a size of the first light emitting region in the second direction.

Optionally, a size of the second light emitting region in the first direction is in a range of 50 microns to 100 microns, and the size of the second light emitting region in the second direction is in a range of 50 microns to 100 microns.

Optionally, light emitted by the circular light emitting region is reflected by a target object at a longest detection range of the lidar, a light spot formed on the receiving unit is received by the receiving unit, and a size of the light spot is not greater than a size of the receiving unit.

Optionally, a spacing between centers of the first light emitting region and the second light emitting region is in a range of 150 microns to 200 microns.

Correspondingly, the technical solutions of the present invention further provide a lidar, including: a light emitting unit, configured to provide emission light; and at least one light receiving unit, corresponding to the light emitting unit, and configured to detect an echo light formed after the emission light is reflected by a target object.

Optionally, the light receiving unit includes a photosensitive surface, where the photosensitive surface represents a circular surface.

Optionally, the light receiving unit includes a silicon photomultiplier or a single-photon avalanche diode array.

Optionally, the light receiving unit is arranged in the following manner: a center of the circular surface coincides with a center of a light spot formed by reflection of a beam, which is emitted by the first light emitting region, and reflected by a target object at a longest detection range of the lidar, and where a size of the photosensitive surface is not less than a size of the light spot.

Optionally, the lidar further includes: a first optical assembly, located downstream of an optical path of the light emitting unit, and configured to shape the light emitted by the light emitting unit and then emit the shaped light; and a second optical assembly, located upstream of the optical path of the light receiving unit, and configured to focus the echo light onto the light receiving unit.

Optionally, the emission light of the first light emitting region and the second light emitting region is shaped into a beam of light to be emitted through the first optical assembly.

Optionally, the lidar further includes: an aperture stop, located between the second optical assembly and the light receiving unit and at a focal plane of the second optical assembly.

Beneficial Effects of the Invention

Beneficial Effects

Compared with the prior art, the technical solutions of the present invention have the following advantages: The light emitting unit in embodiments of the present invention includes: a first light emitting region, and a second light emitting region which is further arranged on a side of the first light emitting region away from the light receiving unit, and configured to provide emission light used for performing compensation for a short-range blind region of the lidar in the first light emitting region. And, the first light emitting region and the second light emitting region form the same light emitting channel. In the embodiments of the present invention, through adding the second light emitting region on a side of the first light emitting region located in the same light emitting channel that is away from the light receiving unit, a light source of a light emitting unit becomes a long light source, thereby implementing compensation for a short-range blind region for the first light emitting region. On one hand, the blind region of the lidar is reduced; on the other hand, compared with a solution of performing compensation for a blind region by increasing emission power of the light emitting unit, the embodiments of the present invention reduce the emission power.

In an optional solution, the photosensitive surface of the lidar represents a circular surface, which matches a shape of the light spot formed by the echo light on the light receiving unit, so that more energy of the light spot can fall into the photosensitive surface, thereby increasing the quantity of echo signals received by the light receiving unit, to thereby enhance a capability of long-range detection. In addition, in the embodiments of the present invention, since a relatively large area of the light spot can be detected by the photosensitive surface, emission energy of the emission light is fully utilized to perform detection, thereby reducing emission power of the light emitting unit.

DETAILED DESCRIPTION

As described in the background, a lidar has a problem of high emission power. With reference to a schematic diagram of an optical path of a lidar in FIG. 1, a reason of high emission power of the lidar is analyzed below.

Figure 1:
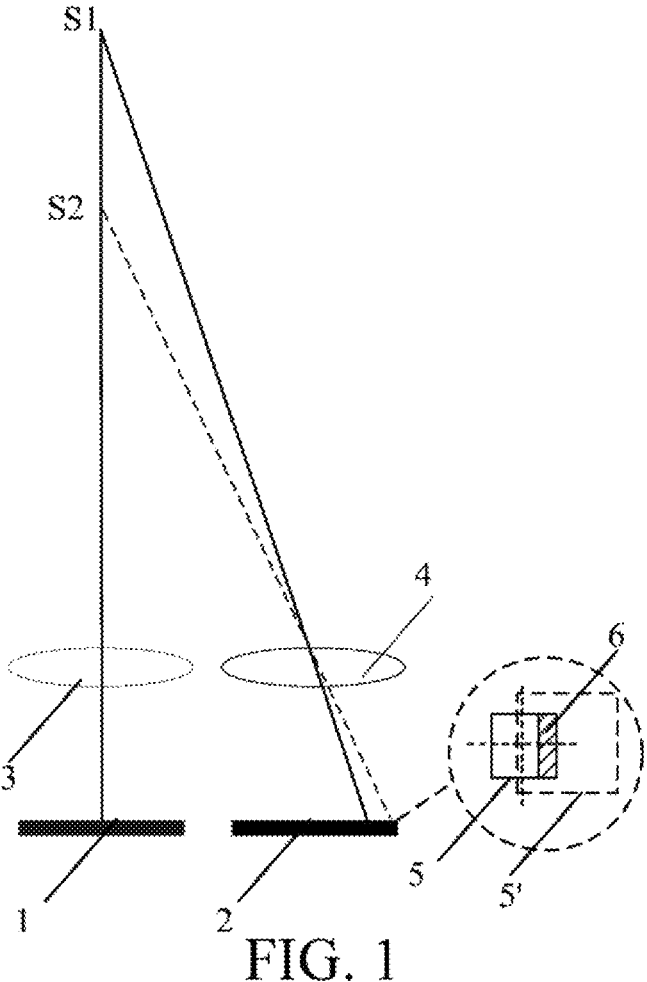
FIG. 1 is a schematic diagram of an optical path of a lidar.

A light emitting unit 1 includes a plurality of lasers, configured to provide emission light that is projected to a target object S1 (or S2), where the emission light reaches the target object S1 (or S2) after being shaped by a first optical assembly 3, and then an echo light is formed after the emission light is reflected by the target object S1 (or S2). And, the echo light is focused onto a light receiving unit 2 through a second optical assembly 4, and is detected by the light receiving unit 2, thereby detecting distance of the target object S1 (or S2). For an existing lidar using a silicon photomultiplier (SiPM) or a single-photon avalanche diode (SPAD) array as a light receiving unit, since the light receiving unit has extremely high sensitivity, an avalanche effect can be triggered when the SPAD unit receives one photon. In addition, based on a consideration of improving a signal-to-noise ratio, a size of a photosensitive surface of the light receiving unit 2 is relatively small. The light receiving unit is arranged in a range of a light spot formed by the echo light to receive a part of energy of the light spot, so that an echo signal can be obtained to perform a light-to-electricity conversion and ranging A circular dashed box in FIG. 1 shows a schematic diagram of a light spot 5 (or 5') formed by the echo light on the light receiving unit 2 and a photosensitive surface 6 of the light receiving unit 2. An area of the light spot 5 (or 5') formed by the target object S1 (or S2) is larger than an area of the photosensitive surface 6, and a part of the light spot 5 (or 5') is detected by the photosensitive surface 6, thereby implementing detection on the target object S1 (or S2). However, a part of the light spot 5 (or 5') is still located outside the photosensitive surface 6 and cannot be detected by the photosensitive surface 6. The solution is generally used for a short-range lidar. However, for a long-range lidar, the lidar shown in FIG. 1 does not fully utilize the emission light of the lidar to detect. A light spot formed through reflection by a target object in a long-range has a small size and low energy, and sufficient valid information cannot be obtained by detecting only a small part of energy of the light spot.

In addition, there is a blind region in the lidar during short-range detection. Specifically, still referring to the optical path diagram in FIG. 1, the light emitting unit 1 and the light receiving unit 2 in the lidar are arranged in the same direction, and an emitting end and a receiving end respectively have an optical assembly to form a non-coaxial optical path. The non-coaxial optical path can achieve that emission and reception of light are separated from each other and do not interfere with each other. However, the non-coaxial optical path has a near-far effect, that is, when a distance of the target object changes, the light spot of the echo light on the photosensitive surface moves. As shown in FIG. 1, a light spot formed by the long-range target object S1 on the light receiving unit 2 is 5, and a light spot formed by the short-range target object S2 on the light receiving unit 2 is 5'. That is, as the distance of the target object gradually decreases, the light spot moves in a direction away from the light emitting unit 1. When the distance of the target object is reduced to a critical distance, the light spot moves out of the photosensitive surface 6 of the light receiving unit 2, so that the target object cannot be detected by the lidar. That is, the lidar cannot detect the distance of a target object that is within the critical distance, so that there is a blind region.

Figure 2:
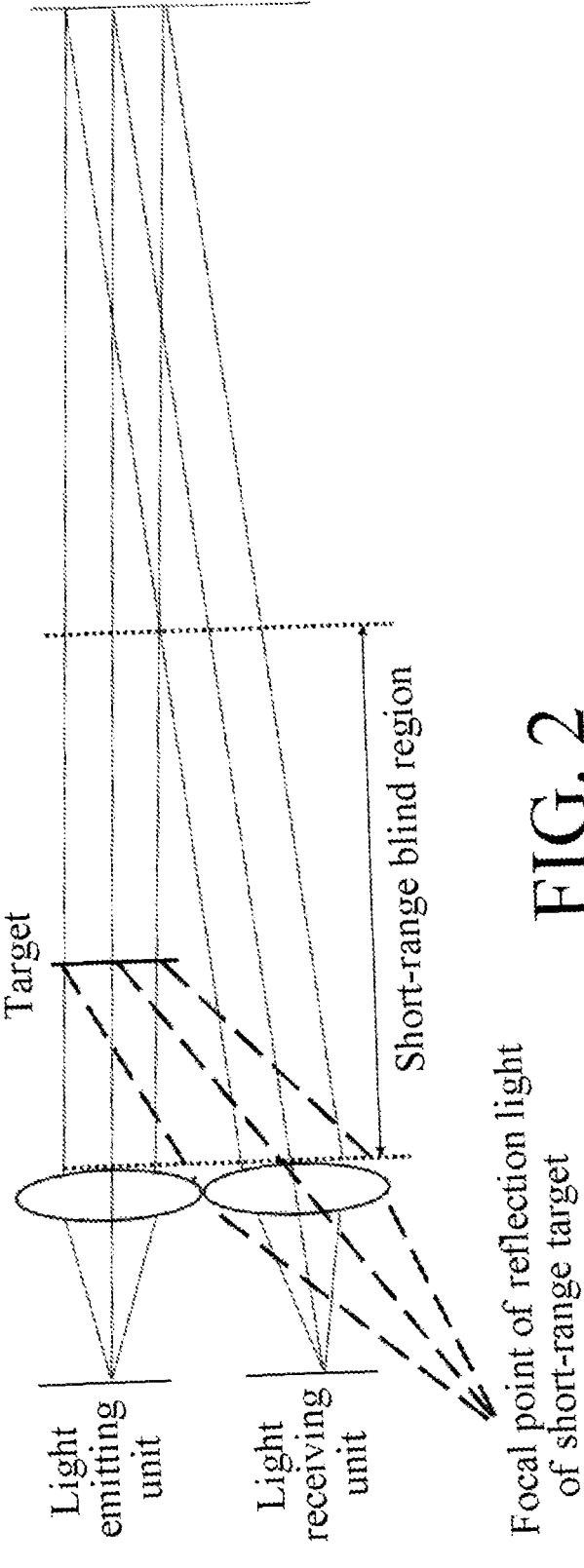
FIG. 2 is a schematic diagram of an optical path of another lidar.

Specifically, referring to FIG. 2, there is a target object in a short-range blind region, and an image point formed by signal light that is reflected back by a short-range target through a receiving lens is not on a focal plane of the receiving lens (a position in which the light receiving unit is located in the figure), but behind the focal plane. In addition, in a viewing angle of FIG. 2, the short-range target is above an optical axis of the receiving lens, so the image point formed by the short-range target through the receiving lens is certainly below the optical axis of the receiving lens. Considering these two aspects comprehensively, a relative position of a focal point of reflected light of the short-range target and the light receiving unit is shown in FIG. 2. Within a short-range blind region of the lidar, the light receiving unit of the lidar cannot receive a reflected signal of the target completely.

In the prior art, compensation is performed on the short-range blind region of the lidar by using a prism or an optical fiber to deflect a part of light to the short-range blind region, or two or more light emitting units are arranged in a light emitting channel to emit detection light toward different directions, so that a part of the detection light can be reflected by a target object in the blind region and received by the light receiving unit. It can be learned that the existing technologies all need to arrange additional optical elements to perform compensation for a blind region. While in this application, detection on target objects at different distances can be implemented by using a laser source. Accordingly, on the basis of reducing the short-range blind region, additional optical elements for performing compensation for a blind region are omitted, thereby reducing system complexity of the lidar, and reducing costs of production and difficulty of assembly.

To resolve the foregoing technical problems, the laser source in the embodiments of the present invention includes: at least two light emitting regions, where sizes of the at least two light emitting regions are different.

The at least two light emitting regions can emit lights of different intensity or power, and uneven lighting is needed in a certain region.

The at least two light emitting regions share a same activation signal, and are simultaneously driven to emit light, which can implement simultaneous control of each light emitting region. In other embodiments, the at least two light emitting regions may alternatively be driven by using different activation signals, thereby implementing separate control of each light emitting region.

Further, the light emitting unit for a lidar provided in this embodiment of the present invention includes: a first light emitting region, and a second light emitting region which is further arranged on a side of the first light emitting region away from the light receiving unit, and configured to provide emission light used for performing compensation for a blind region of the first light emitting region. And, the first light emitting region and the second light emitting region form the same light emitting channel. In this embodiment of the present invention, by adding the second light emitting region on a side of the first light emitting region located in the same light emitting channel that is away from the light receiving unit, the compensation for a short-range blind region is implemented on the first light emitting region. On one hand, a detection range of the lidar is increased; on the other hand, compared with a solution of performing compensation for a blind region by increasing power of the light emitting unit, this embodiment of the present invention reduces emission power; moreover, compared with a solution of performing compensation for a blind region by adding a light deflection element, this embodiment of the present invention simplifies a structure of the lidar and reduces difficulty of assembly and costs of production.

In this embodiment, the same light emitting channel refers to that the first light emitting region and the second light emitting region of the light emitting unit share a same activation signal, and can be simultaneously driven to emit light. A multi-line lidar includes a plurality of light emitting channels and a plurality of corresponding receiving channels, and can emit and receive a plurality of beams of lasers to perform distance detection respectively. Currently, there are multi-line lidars such as 4-line, 8-line, 16-line, 32-line, 64-line, and 128-line lidars on the market. The light emitting unit provided in this embodiment of the present invention includes the first light emitting region and the second light emitting region that serve as a light source of the same line, that is, a light emitting channel, and is used for target object detection.

Figure 3:
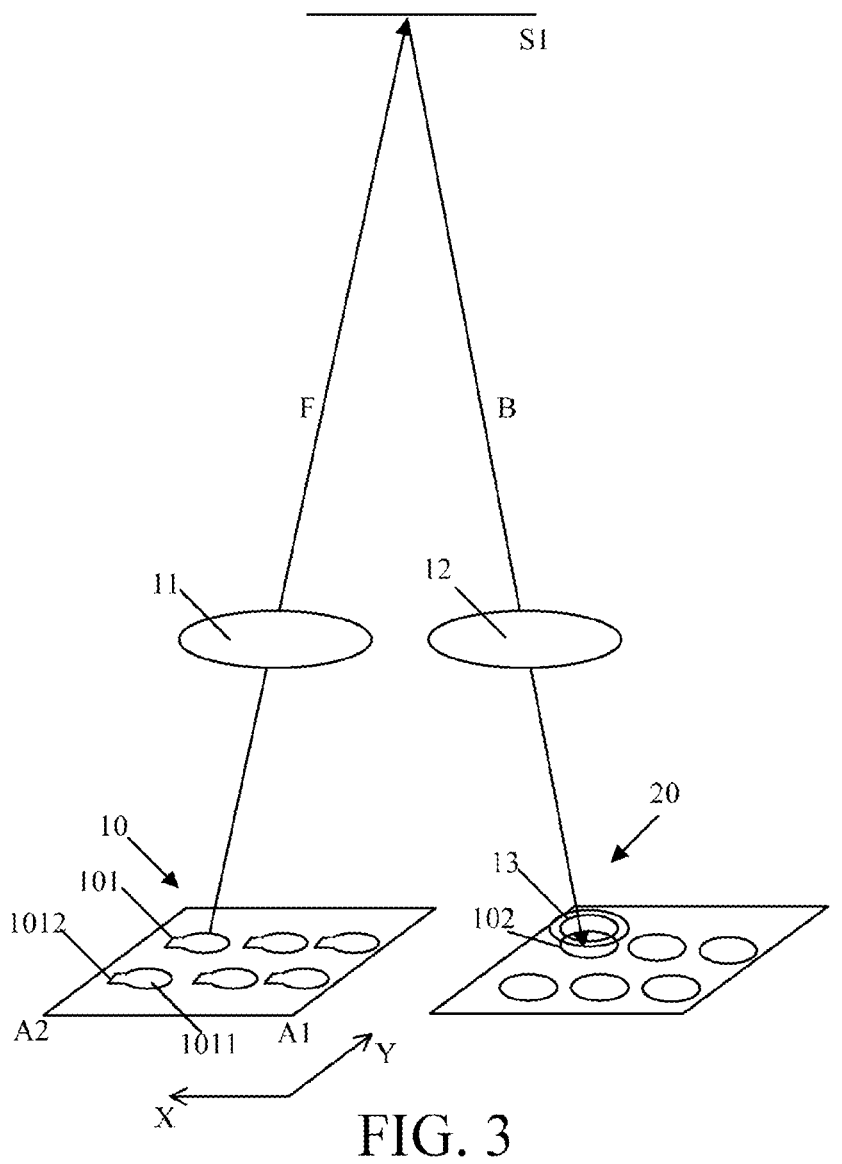
FIG. 3 is a schematic diagram of an optical path of a light emitting unit according to an embodiment of the present invention.

FIG. 3 is a schematic diagram of an optical path of a light emitting unit according to an embodiment of the present invention.

The light emitting unit 10 in this embodiment of the present invention is applied to a lidar, and is configured to provide emission light that implements target object detection. The lidar further includes a light receiving unit 20, corresponding to the light emitting unit 10, and configured to detect an echo light.

It should further be noted that, for concise drawings, only six light emitting units 10 arranged in two rows and three columns and six light receiving units 20 correspondingly arranged in two rows and three columns, which are applied to the lidar, are shown in FIG. 3, and the present invention should not be limited thereby.

The lidar in FIG. 3 includes: a plurality of light emitting units 10, a first optical assembly 11, a second optical assembly 12, an aperture stop 13, and a plurality of light receiving units 20, where the plurality of light receiving units 20 correspond to the light emitting units 10, and are configured to detect the echo lights formed by the emission light corresponding to the light emitting units 10.

Figure 4:
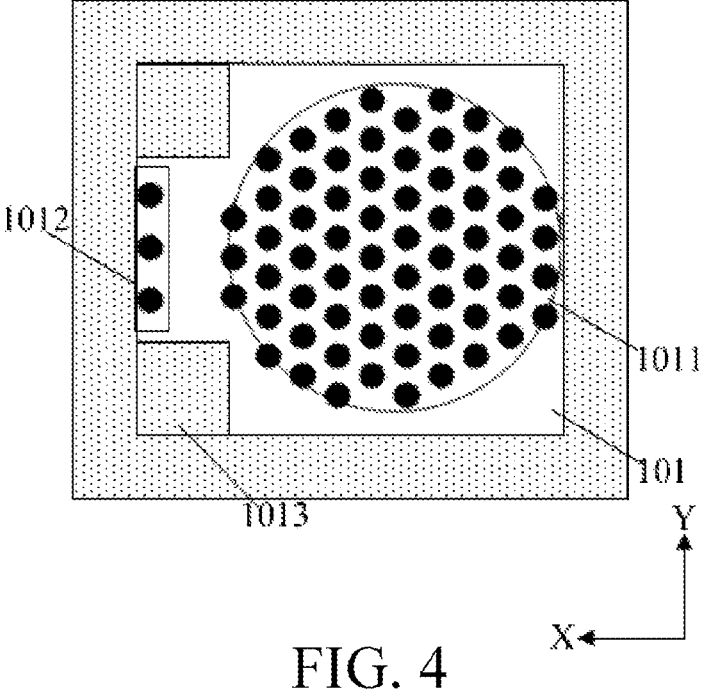
FIG. 4 is a top view of a light emitting unit according to an embodiment of the present invention.
Figure 5:
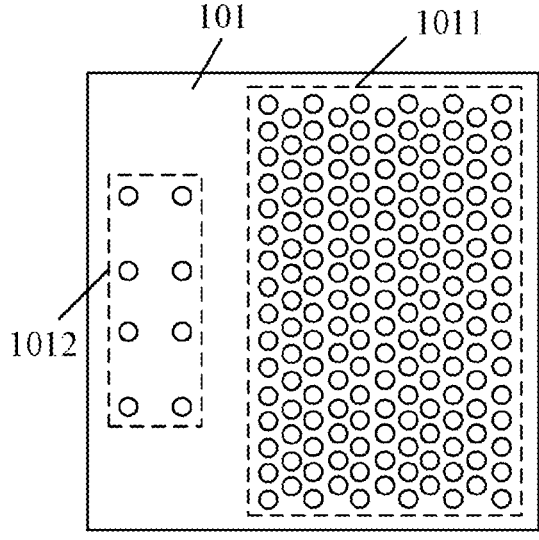
FIG. 5 is a top view of another light emitting unit according to an embodiment of the present invention.

Referring to FIG. 4 and FIG. 5, the light emitting unit 10 in this embodiment is a planar array of light sources, and includes a light emitting surface 101 on which a plurality of light sources are formed.

Specifically, the light source on the light emitting surface 101 is a vertical-cavity surface-emitting laser (VCSEL), which is a laser that can emit a laser in a direction perpendicular to a substrate.

The VCSEL includes: a substrate (or base plate) (for example, a gallium arsenide (GaAs) substrate), a resonant cavity on the substrate, where the resonant cavity includes a bottom Bragg reflector, an active region, and a top Bragg reflector that are sequentially located on the substrate, and there is a light emitting window above the resonant cavity. Specifically, the active region may be a quantum well. The quantum well can generate a photon during loading a current, the photon oscillates in the resonant cavity to form a laser, and the laser is emitted through the light emitting window.

In this embodiment, the VCSELs can emit lasers with wavelengths such as 905 nm and 940 nm. The foregoing wavelengths are beyond a wavelength range of visible light, which can avoid an impact of the visible light on the target object detection.

The plurality of VCSELs of the light emitting unit 10 are arranged into an array, and form a first light emitting region 1011 that is used for emitting emission light F that detects a target object S.

It should be noted that, on one hand, a light spot formed by reflection of the emission light F on a target object beyond a longest detection range cannot be detected; on the other hand, because of a near-far effect of the lidar, the first light emitting region 1011 cannot implement short-range detection. Therefore, there is a blind region. Therefore, the emission light provided by the first light emitting region 1011 can detect a target object within a detection range. A distance less than the detection range is defined as the blind region of the first light emitting region 1011.

It should be noted that, for the plurality of VCSELs located in the first light emitting region 1011, the echo lights formed by the emission light of adjacent lasers through the target object intersect on a photosensitive surface 102, while a light spot of a certain area is formed on the photosensitive surface 102 (not shown in the figure). A shape of the photosensitive surface 102 matches a shape of the first light emitting region 1011.

In an embodiment shown in FIG. 4, the first light emitting region 1011 represents a circular light emitting region. Correspondingly, the emission light F emitted by the entire first light emitting region 1011 represents a circular light beam.

In an embodiment shown in FIG. 5, the first light emitting region 1011 may alternatively be rectangular.

Specifically, the plurality of VCSELs in the first light emitting region 1011 are arranged into a honeycomb array. By this arrangement, on one hand, an area of the first light emitting region 1011 can be effectively utilized to arrange more lasers; on the other hand, the emission light of the first light emitting region 1011 can have good uniformity. In other embodiments, the plurality of VCSELs in the first light emitting region may alternatively be arranged in other manners, for example, a matrix arrangement.

It should be noted that, if a size of the first light emitting region 1011 is excessively large, the light spot of the emission light is larger, so that sizes of a required optical assembly and the light receiving unit 20 also correspondingly increase, which increases an overall size and weight of the lidar. In addition, the power of the emission light is excessively high, which may cause a safety problem on human eyes. If the size of the first light emitting region 1011 is excessively small, the quantity of lasers in the first light emitting region 1011 is also relatively small, and the power of the emission light is low, which affects a detection range of the lidar. Correspondingly, a diameter of the circular first light emitting region 1011 in this embodiment is in a range of 200 microns to 300 microns.

In this embodiment of the present invention, the first light emitting region 1011 is arranged in the following manner: light emitted by the circular light emitting region is reflected by the target object at the longest detection range of the lidar, the light spot formed on the receiving unit is received by the receiving unit, and a size of the light spot is not greater than a size of the receiving unit. Therefore, the emission light F can be fully utilized to detect, which improves utilization of the light and reduces emission power.

The light emitting unit in this embodiment of the present invention further includes a second light emitting region 1012, located on a side of the first light emitting region 1011 away from the light receiving unit 20, and is used for providing emission light that is used for performing compensation for a blind region in first light emitting region 1011 (performing compensation for a blind region may be referred to as compensation for a blind region).

Figure 6:
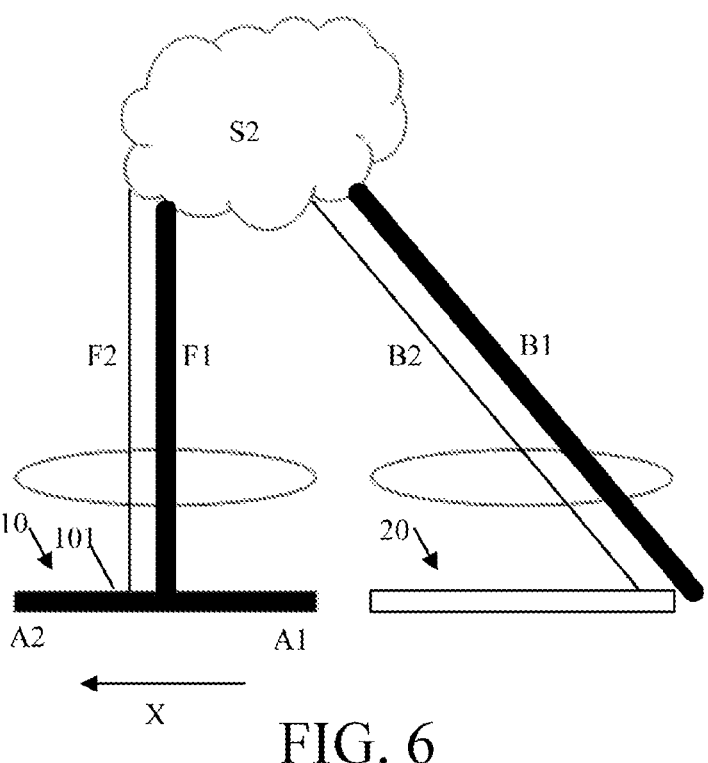
FIG. 6 is a schematic diagram of principles of performing compensation for a blind region in a second light emitting region in FIG. 3.

With reference to FIG. 6, an end of the light emitting unit 10 that is arranged close to the light receiving unit 20 is a first end A1, and an end of the light emitting unit 10 that is arranged away from the light receiving unit 20 is a second end A2. A direction from the first end A1 to the second end A2 is a first direction X. The light emitting surface 101 includes the second light emitting region 1012 on a side that is away from the light receiving unit 20 in the first direction X.

The second light emitting region 1012 includes one or more vertical-cavity surface-emitting lasers, and the emission light of the second light emitting region 1012 is used for performing compensation for a short-range target object located in the blind region of the first light emitting region.

A principle of performing compensation for a blind region by the second light emitting region 1012 is described below with reference to the optical path diagram shown in FIG. 6.

As shown in FIG. 6, emission light F1 of the first light emitting region 1011 forms an echo light B1 through a short-range target object S2. The echo light B1 cannot fall into the photosensitive surface, that is, is beyond a detection range of the light receiving unit 20. Therefore, the short-range target object S2 cannot be detected by the light receiving unit of the lidar, and enters a detection blind region of the lidar.

In this embodiment, the light emitting surface 101 further includes the second light emitting region 1012 on a side that is away from the light receiving unit 20 in the first direction X, which is equivalent to causing an entire light emitting region of the light emitting unit 10 to extend in the first direction X, thereby forming a light spot extending in the first direction X. Therefore, even though the light spot of the first light emitting region 1011 that is mainly used for performing distance detection has moved out of the photosensitive surface, an echo light B2 formed by the emission light F2 of the second light emitting region 1012 through the short-range target object S2 can still be detected by the light receiving unit 20, thereby obtaining distance information of the short-range target object S2 and implementing detection on the short-range target object S2.

Still referring to FIG. 3 and FIG. 4, in this embodiment, the first light emitting region 1011 represents a circular light emitting region, and the second light emitting region 1012 represents a rectangular light emitting region.

The direction from the first end A1 to the second end A2 is the first direction X, and a direction perpendicular to the first direction X on the light emitting surface 101 is a second direction Y.

The plurality of vertical-cavity surface-emitting lasers in the rectangular second light emitting region 1012 are arranged in a matrix arrangement. On one hand, the rectangular second light emitting region 1012 extends in the first direction X, which can perform compensation for a blind region. On the other hand, lasers arranged in rows can be arranged on the rectangular second light emitting region 1012 in the second direction Y, thereby ensuring uniformity of the emission light.

The matrix arrangement includes a one-dimensional matrix (that is, a linear array) arrangement and a multi-dimensional matrix (that is, a planar array) arrangement.

It should be noted that, in other embodiments, the second light emitting region 1012 may alternatively be of other shapes, such as oval or trapezoidal. In addition, the plurality of lasers located in the second light emitting region may alternatively be in a staggered arrangement, or arranged into a honeycomb array.

It should further be noted that, in this embodiment, the second light emitting region 1012 includes a plurality of lasers. In practice, the second light emitting region 1012 can perform compensation for a blind region as long as including a laser. In other embodiments, alternatively, only one laser may be arranged in the second light emitting region 1012.

With reference to position relationship diagrams of the light spot formed by the light emitting unit shown in FIG. 3 and the photosensitive surface shown in FIG. 7a to FIG. 7c, a working principle of the light emitting unit is described below. Specifically, FIG. 7a, FIG. 7b, and FIG. 7c respectively show light spots generated by a long-range target object, medium-range target object, and short-range target object.

It should be noted that, in an actual application, a position of the light receiving unit 20 remains unchanged, and a position of the corresponding photosensitive surface also remains unchanged. FIG. 7a to FIG. 7c are compared, when the target object moves from far to near, a light spot 103 generated by the target object moves in a direction away from the light emitting unit 10.

Figure 7A:
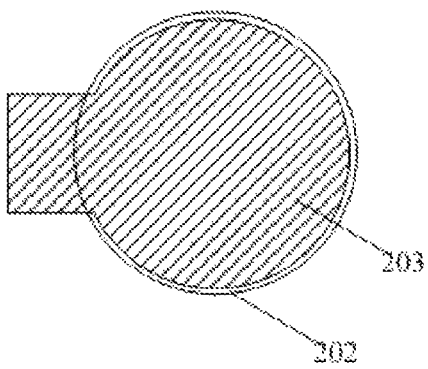
FIG. 7a to FIG. 7c are schematic diagrams of light spots formed by emission light of the light emitting unit shown in FIG. 3 through target objects at different distances.

As shown in FIG. 7a, the light spots 203 overlap which are generated after reflection of the emission light of the first light emitting region 1011 and the second light emitting region 1012 through the target object, where the emission light is emitted after being shaped into a beam of light. In this embodiment, the first light emitting region 1011 is circular, and a formed circular light spot is located in a photosensitive surface 202, and is used for detecting the long-range target object. The second light emitting region 1012 is rectangular, and a rectangular light spot formed by reflection of the long-range target object (for example, any distance within 60 m to 100 m) is located outside the photosensitive surface 202.

Figure 7B:
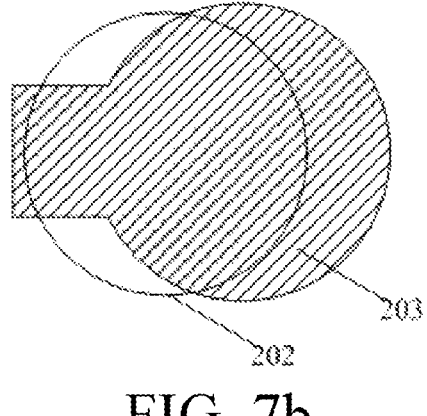

As shown in FIG. 7b, as a distance of the target object decreases, the light spots 203 formed by the circular first light emitting region 1011 and the rectangular second light emitting region 1012 move in the direction away from the light emitting unit 10. A part of the circular light spot generated by the circular first light emitting region 1011 moves out of the photosensitive surface 202, and the circular light spot located in the photosensitive surface 202 can still have sufficient light intensity that can be detected by the photosensitive surface 202. In addition, a part of the light spot 203 formed by the rectangular second light emitting region 1012 is also in the photosensitive surface 202 and therefore detected, thereby helping to implement detection on the medium-range target object (for example, 0.3 m to 30 m).

Figure 7C:
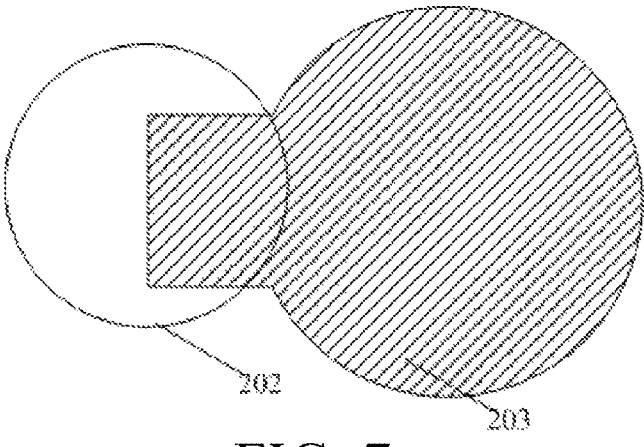

As shown in FIG. 7c, as the distance of the target object further decreases, the light spot 203 moves further in the direction away from the light emitting unit 10 correspondingly. The light spot 203 formed by the circular first light emitting region 1011 completely moves out of the photosensitive surface 202, while the rectangular light spot formed by the rectangular second light emitting region 1012 is located in the photosensitive surface 202 and is used for detecting the short-range (for example, less than 0.3 m) target object located in the blind region, thereby compensating a short-range region that cannot be detected by the emission light of the first light emitting region 1011, to thereby achieve a purpose of performing compensation for a short-range blind region.

It should be noted that, the numerical values herein are only examples. Lidars using components with different parameters have different capabilities of ranging respectively, and their possible definitions of long, medium, and short ranges are different.

With reference to the top view of the light emitting unit in FIG. 3 shown in FIG. 4, technical details of the light emitting unit 10 are described further below.

As shown in FIG. 4, in the light emitting unit in this embodiment of the present invention, a size of the second light emitting region 1012 in the second direction Y is smaller than a size of the first light emitting region 1011 in the second direction Y. Specifically, a length of the rectangular second light emitting region 1012 in the Y direction is less than a diameter of the circular first light emitting region 1011.

A light source of the second light emitting region 1012 is used for performing compensation for a blind region on the short-range target object in the blind region of the lidar, and compared with the long-range target object, a size of a light spot formed by reflection of light generated by light sources of the same size through the short-range target object is relatively large. Therefore, by setting the second light emitting region 1012 into a relatively small size, a light spot that can be detected by the photosensitive surface can be formed. Therefore, the capability of long-range detection of the lidar can be improved, and a short-range blind region can be reduced, thereby obtaining a lidar with excellent performance of ranging in a detection range.

In this embodiment, the second light emitting region 1012 may be set with a relatively small size to reduce the quantity of lasers in the light emitting unit 10, thereby further decreasing emission power.

In addition, as shown in FIG. 4, in this embodiment, a bonding point 1013 is arranged on each of two sides of the second light emitting region 1012 in the second direction Y, and is used for loading electrical signals that activate the first light emitting region 1011 and the second light emitting region 1012 to emit light.

In this embodiment, the size of the second light emitting region 1012 in the second direction Y is smaller than the size of the first light emitting region 1011 in the second direction Y. Therefore, the two sides of the second light emitting region 1012 in the second direction Y have a non-light emitting region in which no laser is formed. The bonding point 1013 is formed on the non-light emitting region, which fully utilizes an area of the light emitting unit 10 and improves structural compactness of the light emitting unit 10.

It should be noted that, if the size of the second light emitting region 1012 is excessively small, the effect of compensation for a blind region is not ideal; and if the size of the second light emitting region 1012 is excessively large, the quantity of lasers may be easily increased to cause a waste of emission power. In this embodiment, a size of the second light emitting region 1012 in the first direction X is in a range of 50 microns to 100 microns, and the size of the second light emitting region 1012 in the second direction Y is in a range of 50 microns to 100 microns.

In this embodiment, light spots overlap, which are formed on the photosensitive surface 202 after reflection of the emission light of the first light emitting region 1011 and the second light emitting region 1012 through the target object, where the emission light is emitted after being shaped into a beam of light, thereby ensuring that the light spots formed by the light emitting unit 10 are detected as a whole by the corresponding light receiving unit 20, to thereby ensure effective detection on the light spots by a light receiving device.

It should be noted that, when a target object at a shorter distance is detected, a size of a light spot formed by reflection is larger. Therefore, in an actual application, for the target object at the longest detection range, the light spots generated by the first light emitting region 1011 and the second light emitting region 1012 can overlap. Accordingly, when the target object at the shorter distance is detected, the light spot that is generated correspondingly has more overlapping regions due to an increased size.

Specifically, a spacing between the first light emitting region 1011 and the second light emitting region 1012 may be set to ensure that the light spots of the two light emitting regions overlap. It should be noted that, if the spacing between the first light emitting region 1011 and the second light emitting region 1012 is excessively large, it is easy to cause that the light spots generated by the two light emitting regions are not easy to intersect. If the spacing between the first light emitting region 1011 and the second light emitting region 1012 is excessively small, it is easy to cause the light spots to have too many overlapping regions, resulting in a waste of emission energy. In this embodiment, a spacing between centers of the first light emitting region 1011 and the second light emitting region 1012 is in a range of 150 microns to 200 microns.

To resolve the technical problems, this embodiment of the present invention further provides a lidar as shown in FIG. 3, and the lidar includes: the light emitting unit in this embodiment of the present invention, configured to provide the emission light F. The emission light F forms an echo light B by reflection through the target object S of the lidar, and the lidar further includes: at least one light receiving unit 20, corresponding to the light emitting unit 10, and configured to detect the emission light F corresponding to the light emitting unit 10.

The light receiving unit 20 includes the photosensitive surface 102, configured to detect the echo light B. The light receiving unit 20 includes the photosensitive surface, and when the light emitting unit 10 shown in FIG. 4 is used, the photosensitive surface 102 represents a circular surface.

With reference to FIG. 3 and FIG. 4, the photosensitive surface 102 of the lidar represents a circular surface, which matches a shape of the light spot formed by the echo light on the light receiving unit 20, so that more energy of the light spot can fall into the photosensitive surface 102, thereby increasing the quantity of echo signals received by the light receiving unit 20, to thereby enhance a capability of long-range detection. In addition, in this embodiment of the present invention, a large amount of energy of the light spot can be detected by the photosensitive surface 102. Therefore, emission energy of the emission light is fully utilized to detect, and the emission power of the light emitting unit can be reduced.

As shown in FIG. 3 and FIG. 4, in this embodiment, the first light emitting region 1011 represents a circular light emitting region, and the photosensitive surface 102 represents a circular surface. The shape of the first light emitting region 1011 and the shape of the photosensitive surface 102 match, so that a shape of the light spot 103 can match the shape of the photosensitive surface 102. Accordingly, a probability that the light spot 103 is detected by the photosensitive surface 102 can be increased, so that almost all energy of the light spot 103 is received by the photosensitive surface 102, thereby improving utilization of emission energy and quality of a long-range signal.

In this embodiment, the light receiving unit 20 set a size of the photosensitive surface 102 to be no less than the size of the light spot formed by reflection of the target object at the longest detection range of the lidar.

Specifically, the echo light B is projected to the photosensitive surface 102 of the light receiving unit 20 to form the light spot. The photosensitive surface 102 converts an optical signal of the light spot into an electrical signal, and then implements detection of the target object distance based on processing and computing on the electrical signal.

The light receiving unit 20 and the light emitting unit 10 are cooperatively arranged in the lidar in this embodiment of the present invention, to achieve that the size of the photosensitive surface 102 is not less than that of the light spot. It should be noted that, the furthest target detection range is a parameter of the lidar, and is one of the design specification values of the lidar. A position, an area, and the like of the photosensitive surface 102 of the light receiving unit 20 are set with reference to the target object at the furthest target detection range, so that the echo light returned by the target object at the furthest target detection range forms the light spot located in the photosensitive surface 102.

As shown in FIG. 7a to FIG. 7c, the light receiving unit 20 may be arranged in the following manner: a center of the circular surface coincides with a center of the light spot formed by reflection of a beam, which is emitted by the first light emitting region 1011 and reflected by the target object at the longest detection range of the lidar, and the size of the photosensitive surface is not less than the size of the light spot.

In this embodiment of the present invention, the light receiving unit is set to cause almost the entire light spot formed by reflection by the target object at the longest detection range of the lidar to fall into the photosensitive surface, so that when the lidar detects the long-range target object, the light spot falls into the photosensitive surface, thereby increasing the quantity of echo signals received by the light receiving unit and enhancing the capability of long-range detection. During detecting the medium-range target object, a large part of the light spot in the photosensitive surface can be detected. During detecting the short-range target object, a part of the light spot can also be located in the photosensitive surface to implement short-range detection. Therefore, in this embodiment of the present invention, the emission energy of the emission light is fully utilized to detect, thereby improving the capability of long-range detection of the lidar and reducing the emission power of the light emitting unit.

In this embodiment, the light spot formed by reflection of the target object at the longest detection range is used as reference to set the position and size of the photosensitive surface 102 in the light receiving unit 20. By setting centers of the two to be coincided, effective detection of the photosensitive surface 102 on the light spot can be ensured, and the emission light of the first light emitting region 1011 can be fully utilized to perform ranging.

In this embodiment, the size of the photosensitive surface 102 is not less than the size of the light spot, so that the light spot can be located in the photosensitive surface 102 to improve utilization of emission energy. On one hand, the capability of long-range detection is improved. On the one hand, emission power can be reduced.

In this embodiment of the present invention, the light receiving unit 20 includes a silicon photomultiplier (SiPM) or a single-photon avalanche diode (SPAD) array, both of which are planar arrays and are photodetectors with extremely high sensitivity. Compared with a conventional avalanche photodiode, an area of the photosensitive surface required by detection of the lidar can be reduced, thereby reducing the size of the light receiving unit, which helps to a development need for miniaturization of the lidar.

As shown in FIG. 3, the lidar further includes: the first optical assembly 11, located downstream of the optical path of the light emitting unit 10, and configured to shape the emission light F of the light emitting unit 10 and then project the emission light F to the target object S.

In this embodiment, the emission light F of the first light emitting region 1011 and the second light emitting region 1012 forms into a beam of light after being shaped by the first optical assembly 11, so that two light spots correspondingly formed by the echo light overlap (that is, there is no spacing between the circular light spot and the rectangular light spot in FIG. 7*a* to FIG. 7*c*), thereby reducing a detection omission of the target object in a short-range region.

Specifically, the first optical assembly 11 may include optical elements such as a lens and a collimator.

Still referring to FIG. 3, in this embodiment, the lidar further includes: the second optical assembly 12, located upstream of the optical path of the light receiving unit 20, and configured to focus the echo light B onto the light receiving unit 20, so that light intensity of the echo light B can be increased, which helps to increase a longest detection range of the lidar and improve quality of long-range detection.

The lidar in this embodiment further includes: the aperture stop 13, located between the second optical assembly 12 and the light receiving unit 20 and at a focal plane of the second optical assembly 12.

It should be noted that, generally, a planar array of the light receiving unit 20 is also located at the focal plane of the second optical assembly 12. The aperture stop 13 in this embodiment is configured to restrict the echo light B and filter stray light, to make the light spot generated by the echo light B located within a range of the photosensitive surface 102.

In this embodiment, the aperture stop 13 is arranged. The echo light is restricted by a hole for light to pass through in the aperture stop to form a circular light spot. By setting the photosensitive surface 102 and the first light emitting region 1011 to be both circular, more light can pass through the aperture stop 13, thereby improving utilization of the light and avoiding a waste of emission energy. The first light emitting region 1011 is circular, which helps to shaping of the emission light, reduces an angle of divergence of the emission light, and can increase power of the echo signal, thereby helping to improve the capability of long-range detection of the lidar.

It should be noted that, in this embodiment, a shape of the circular light spot formed by the circular first light emitting region 1011 matches a shape of the aperture stop 13. Therefore, a diaphragm with a relatively small aperture can be used (for example, compared with the rectangular light emitting region, an aperture of the aperture stop is equal to a rectangle diagonal, and thus there is a relatively large gap left between an inner diameter of the aperture stop and an edge of the rectangle light spot), thereby improving accuracy of light alignment.

In other embodiments, the aperture stop may not be arranged in the lidar, and the light spot can fall into the photosensitive surface by configuring a relative relationship between the light emitting unit and the light receiving unit.

It should further be noted that, in other embodiments, the first light emitting region may alternatively be of other shapes such as a regular polygon (for example, a pentagon, hexagon, and the like) or an oval. Correspondingly, the photosensitive surface may alternatively be of other shapes, and the shape of the photosensitive surface may alternatively do not match the shape of the first light emitting region. For example, the first light emitting region is a regular hexagon light emitting region, and the photosensitive surface represents a circular surface; alternatively, the first light emitting region represents an oval light emitting region, and the photosensitive surface represents an oval surface.

It should be noted that, in the foregoing embodiments, the lidar includes a plurality of light emitting units and a plurality of corresponding light receiving units. In other embodiments, the lidar may alternatively include only one light emitting unit and a corresponding light receiving unit.

In the lidar in the embodiments of the present invention, the light emitting unit and the light receiving unit are mutually configured, so that the lidar has relatively small emission power and can implement long-range detection.

Although the present invention is disclosed above, the present invention is not limited thereto. Any person skilled in the art can make various changes and modifications without departing from the spirit and the scope of the present invention, and therefore the protection scope of the present invention should be subject to the scope defined by the claims. Although the present invention is disclosed above, the present invention is not limited thereto. Any person skilled in the art can make various changes and modifications without departing from the spirit and the scope of the present invention, and therefore the protection scope of the present invention should be subject to the scope defined by the claims.

What is claimed is:

1. A laser source of a lidar including a plurality of light emitting channels, comprising:

at least two light emitting regions: a first light emitting region and a second light emitting region, both light emitting regions being disposed on a same light emitting surface and being included in a same light emitting channel of the lidar, wherein sizes of the at least two light emitting regions are different, wherein the first light emitting region is configured to emit a first light beam toward a first detection region, and the second light emitting region is configured to emit a second light beam toward a second detection region representing a blind region of the first light emitting region, the blind region being located at a distance from the laser source shorter than that of the first detection region.

2. The laser source according to claim 1, wherein the at least two light emitting regions share a same activation signal and are simultaneously driven to emit light.

3. The laser source according to claim 1, wherein the second light emitting region includes a reduced quantity of lasers than the first light emitting region and emits a reduced power of light relative to the first light emitting region.

4. The laser source according to claim 1, wherein each of the light emitting regions comprises one or more vertical-cavity surface-emitting lasers.

5. The laser source according to claim 4, wherein a plurality of vertical-cavity surface-emitting lasers are arranged into a circle in at least one light emitting region.

6. The laser source according to claim 4, wherein a plurality of vertical-cavity surface-emitting lasers are arranged into a rectangle in at least one light emitting region.

7. A light emitting unit for a lidar, comprising:
a first light emitting region; and a second light emitting region, both light emitting regions being disposed on a same light emitting surface;
wherein sizes of the first light emitting region and the second light emitting region are different, and the first light emitting region and the second light emitting region form a same light emitting channel;
wherein the first light emitting region is configured to emit a first light beam toward a first detection region, and the second light emitting region is configured to emit a second light beam toward a second detection region representing a blind region of the first light emitting region, the blind region being located at a distance from the laser source shorter than the first detection region; and
wherein the first light emitting region and the second light emitting region detect target objects at different distances, respectively.

8. The light emitting unit according to claim 7, wherein the second light emitting region is farther from a light receiving unit of the lidar than the first light emitting region.

9. The light emitting unit according to claim 8, wherein the first light emitting region represents a circular light emitting region.

10. The light emitting unit according to claim 7, wherein the second light emitting region represents a rectangular light emitting region.

11. The light emitting unit according to claim 9, wherein the circular light emitting region comprises a plurality of vertical-cavity surface-emitting lasers, wherein the plurality of vertical-cavity surface-emitting lasers are arranged in a honeycomb array in the circular light emitting region.

12. The light emitting unit according to claim 10, wherein the second light emitting region comprises one or more vertical-cavity surface-emitting lasers, wherein the plurality of vertical-cavity surface-emitting lasers are in a matrix arrangement or staggered arrangement.

13. The light emitting unit according to claim 9, wherein a diameter of the circular light emitting region is in a range of 200 microns to 300 microns.

14. The light emitting unit according to claim 8, wherein the light emitting unit comprises a first end near the light receiving unit and a second end away from the light receiving unit, a direction from the first end to the second end represents a first direction, the light emitting unit comprises a light emitting surface, and a direction in the light emitting surface that is perpendicular to the first direction represents a second direction; and
wherein a size of the second light emitting region in the second direction is smaller than a size of the first light emitting region in the second direction.

15. The light emitting unit according to claim 14, wherein a size of the second light emitting region in the first direction is in a range of 50 microns to 100 microns, and the size of the second light emitting region in the second direction is in a range of 50 microns to 100 microns.

16. The light emitting unit according to claim 9, wherein light emitted by the circular light emitting region is reflected by a target object at a longest detection range of the lidar, a light spot formed on the receiving unit is received by the receiving unit, and a size of the light spot is not greater than a size of the receiving unit.

17. The light emitting unit according to claim 7, wherein a spacing between centers of the first light emitting region and the second light emitting region is in a range of 150 microns to 200 microns.

18. A lidar, comprising:
the light emitting unit according to claim 7, configured to provide emission light; and
at least one light receiving unit, corresponding to the light emitting unit, and configured to detect an echo light formed after the emission light is reflected by a target object.

19. The lidar according to claim 18, wherein the light receiving unit comprises a photosensitive surface, wherein the photosensitive surface represents a circular surface.

20. The lidar according to claim 18, wherein the light receiving unit includes a silicon photomultiplier or a single-photon avalanche diode array.

21. The lidar according to claim 19, wherein the light receiving unit is arranged in the following manner: a center of the circular surface coincides with a center of a light spot formed by reflection of a beam which is emitted by the first light emitting region and reflected by a target object at a longest detection range of the lidar, and wherein a size of the photosensitive surface is not less than a size of the light spot.

22. The lidar according to claim 18, further comprising:
a first optical assembly, located downstream of an optical path of the light emitting unit, and configured to shape the light emitted by the light emitting unit and then emit the shaped light; and a second optical assembly, located upstream of the optical path of the light receiving unit, and configured to focus the echo light onto the light receiving unit.

23. The lidar according to claim 22, wherein the emission light of the first light emitting region and the second light emitting region is shaped into a beam of light to be emitted through the first optical assembly.

24. The lidar according to claim 22, further comprising:
an aperture stop, located between the second optical assembly and the light receiving unit and at a focal plane of the second optical assembly.

* * * * *